United States Patent [19]

Anderson et al.

[11] 4,024,775

[45] May 24, 1977

[54] HYDROSTATIC MECHANICAL TRANSMISSION AND CONTROLS THEREFOR

[75] Inventors: Arlynn W. Anderson, Peoria; Delbert D. Dester, Washington; Edwin E. Hanson, Peoria, all of Ill.

[73] Assignee: Caterpillar Tractor Co., Peoria, Ill.

[22] Filed: July 9, 1975

[21] Appl. No.: 594,430

[52] U.S. Cl. .............................................. 74/687
[51] Int. Cl.² ...................................... F16H 47/04
[58] Field of Search .................. 74/687, 689, 691

[56] References Cited

UNITED STATES PATENTS

| | | | |
|---|---|---|---|
| 2,808,737 | 10/1957 | Bullard | 74/687 |
| 2,939,342 | 6/1960 | Woydt et al. | 74/687 |
| 2,972,905 | 2/1961 | Bullard | 74/687 X |
| 3,106,855 | 10/1963 | Reichenbaecher | 74/705 |
| 3,204,486 | 9/1965 | De Lalio | 74/687 |
| 3,298,174 | 1/1967 | Stoyke et al. | 74/687 |
| 3,496,803 | 2/1970 | Whelahan | 74/687 X |
| 3,580,107 | 5/1971 | Orshansky, Jr. | 74/687 |
| 3,611,838 | 10/1971 | Utter | 74/687 X |
| 3,733,931 | 5/1973 | Nyman | 74/687 X |
| 3,842,694 | 10/1974 | Marlow | 74/687 X |
| 3,864,991 | 2/1975 | Nembach | 74/687 |

*Primary Examiner*—Edgar W. Geoghegan
*Attorney, Agent, or Firm*—Phillips, Moore, Weissenberger, Lempio & Majestic

[57] ABSTRACT

A hydrostatic mechanical transmission is disclosed having an infinitely variable split torque, planetary drive unit driving a set of range gears, in part mechanically and the remainder through a hydrostatic path comprising variable displacement hydrostatic devices acting alternately as a pump or motor and controlled through a system of hydraulic valves utilizing the same fluid as the hydrostatic devices. Five forward and two reverse ranges are provided in a relatively small package. Control is effected through a manually operated shift lever providing control signals to both the variable displacement hydrostatic devices and range selector unit, with appropriate control and safety features being provided to assure positive and smooth range changes, to prevent reverse rotation in the hydraulic unit, to sense a zero speed condition in the hydraulic units, and to insure positively synchronizing and matching speed conditions for gear engagement.

11 Claims, 14 Drawing Figures

FIG. 2.
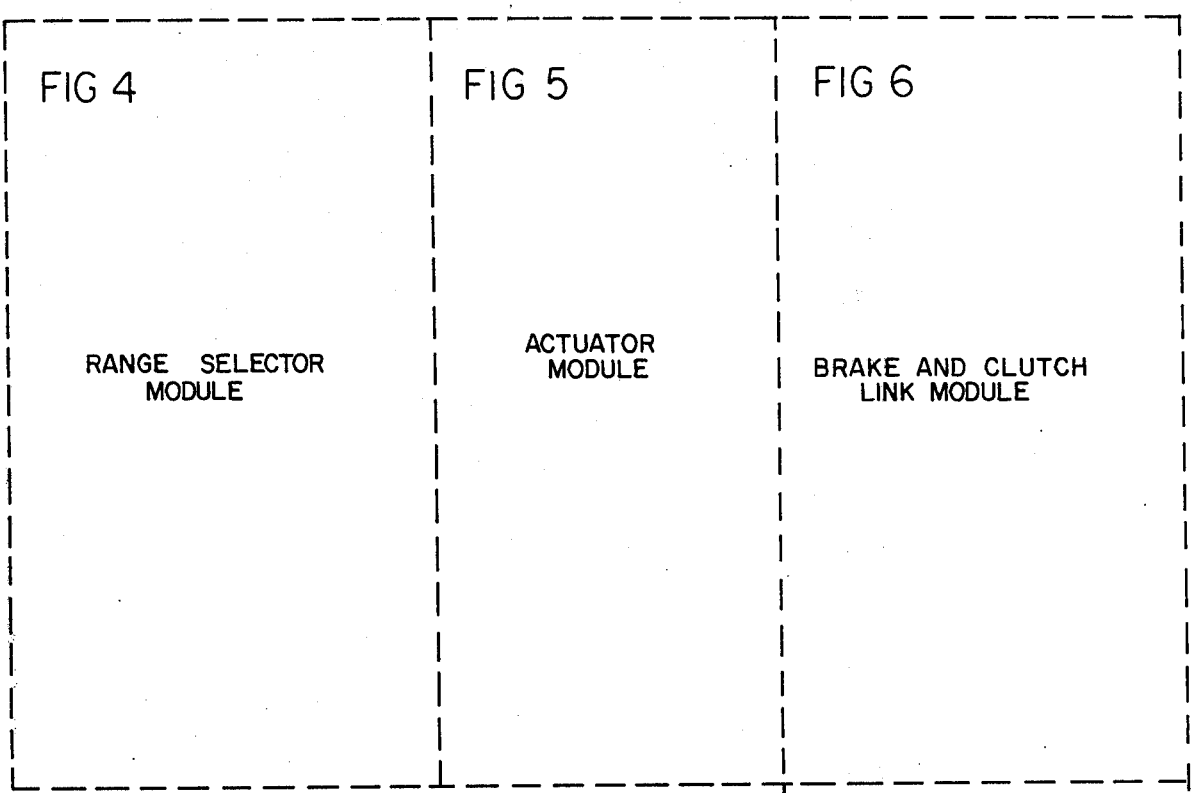
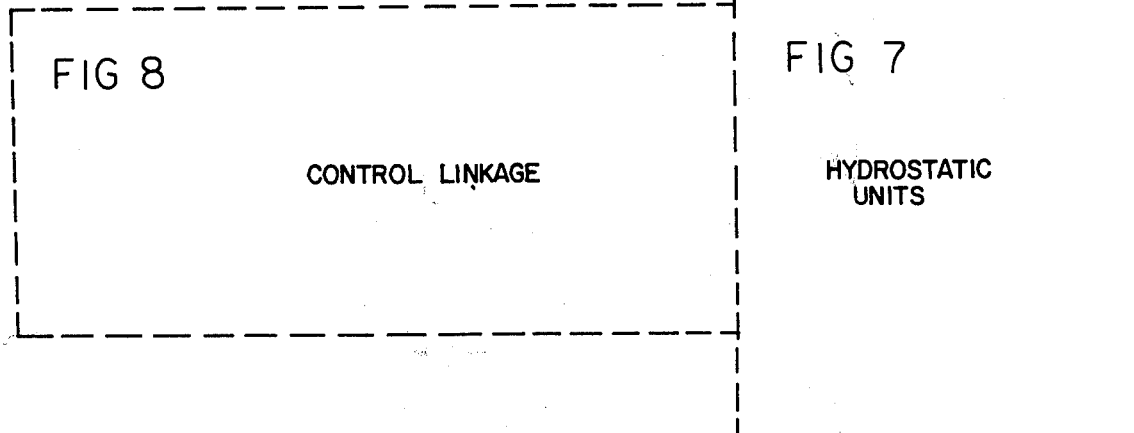
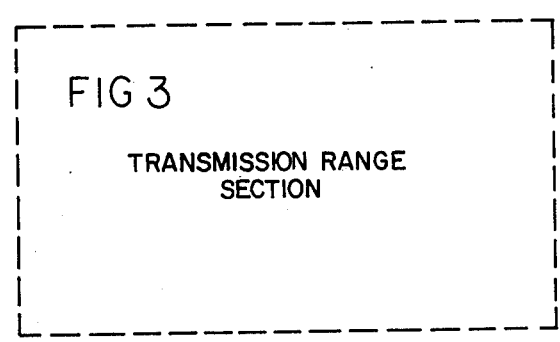

ASSUMING A CONSTANT INPUT HORSEPOWER

HYDROSTATIC MECHANICAL TRANSMISSION AND CONTROLS THEREFOR

BACKGROUND OF THE INVENTION

Large diesel engines, to be efficient, are operated at a constant speed. When operating at a constant speed, such an engine provides very high torque output to the output shaft of an associated transmission while such shaft is rotating at a slow speed. Consequently, such engines require large transmissions particularly at low output speeds. One method of providing a high torque output at such low speeds has been to use a recycling hydrostatic mechanical transmission of the design described by Orshansky in U.S. Pat. No. 3,580,107, issued May 25, 1971. Such a recycling transmission as attributed to Orshansky reduces the need for an excessively large hydrostatic unit at the high torque low output speed encountered in the starting range of a vehicle using a large diesel engine. A similar transmission atrributable to Hans Reichenbaecher is found in U.S. Pat. No. 3,106,855 issued Oct. 15, 1953. Control of both these systems is through a series of cams and push rods.

Hyrdostatic mechanical transmissions utilizing a recycling planetary group in the past have encountered difficulty in sensing the synchronous speed necessary in coupling the various range gear sets and holding this synchronous speed until the next range is coupled. As a corollary to this problem, a problem has been encountered in determining the most advantageous time to reverse the stroking of the hydrostatic units, whose displacement and speeds are inversely related, through the multiple and repetitive steps. Also encountered in the coupling engagement and disengagement, is the problem of energy waste when the operator strokes the hydrostatic units beyond the point of range synchronization.

As noted above, earlier transmissions of this type have required large hydrostatic units, especially in the starting range, thereby raising the cost of manufacture of the hydrostatic unit and the vehicle itself. Provision of a reverse range for heavy duty hydrostatic mechanical transmissions has proved to be a complex and costly problem. Most vexing has been the problem of controlling heavy duty transmissions in all vehicle speed requirements while running at near or full engine throttle. As a corollary to this problem, it is necessary to provide a safety device for neutralizing the transmission control when the vehicle is out of operation with the engine stopped. Finally, previous transmissions have failed to satisfactorily provide a constant output torque throughout the starting range without a complex structure.

SUMMARY OF THE INVENTION

It is accordingly an object of this invention to provide a hydrostatic mechanical transmission and the associated control system in which the associated range coupling engagement may be smoothly accomplished by sensing synchronous speed in the range couplings and holding the synchronous speed until the next range is fully engaged.

it is a further object of this invention to provide a control system for controlling variable displacement hydrostatic units through multiple and repetitive steps where the displacement and speeds of the variable displacement hydraulic units are inversely related through each step.

It is a further object of this invention to minimize energy waste caused by overstroking hydrostatic units at the point of range synchronization.

It is still further object of this invention to provide a means for reversing the stroking of the hydrostatic units in a simple manner at the transition from one range to the next range.

It is a still further object of this invention to insure that range couplings once engaged remain engaged until engagement of the next gear ratio.

It is also an object of this invention to reduce the space necessary for a hydrostatic mechanical transmission by utilizing smaller hydrostatic units while still retaining the necessary torque output.

It is also an object of this invention to provide a reverse range for a heavy duty hydrostatic mechanical transmission which is both economical to construct and simple to maintain.

It is a still further object of this invention to provide a starting range which gives constant output torque throughout the range without a complexity of structure.

It is also an object of this invention to minimize torque losses in the recycling planetary arrangement of the input split torque system.

It is a still further object of this invention to provide a fluid pressure control system using the same fluid pressure source as the hydrostatic devices for a heavy duty transmission which is capable of controlling both the mechanical aspects and the hydraulic aspects at all vehicle speed requirements while the engine is running at near full throttle, and further to provide a safety device for neutralizing this transmission.

Broadly stated, the invention is a split torque transmission having an input shaft and an output shaft, a recycling planetary gear group comprising a first planetary gear assembly and a second planetary gear assembly, the input shaft driving a common planet carrier, the planet gears of the first planetary gear assembly intermeshing with the planet gears of the second planetary gear assembly, the first planet gears intermeshing with a first sun gear and a first ring gear, and the second planet gears intermeshing with a second sun gear and a second ring gear. The transmission also includes a hydrostatic drive means comprising first and second variable displacement hydrostatic devices, the two coupled together, and each device able to act as a motor while the other device acts as a pump. The first hydrostatic device drivingly connects to the first sun gear through a first gear train assembly, while the second hydrostatic device is drivingly connected through a second gear train assembly to the second sun gear. The transmission also comprises a directional drive gear train assembly which may be selectively engaged or disengaged by a first clutch means from the same second gear train assembly connecting the second hydrostatic device with the second sun gear. A second clutch means and a fourth gear train assembly also permits selective engagement and disengagement of the directional drive gear train assembly wth the second ring gear; while a third clutch means and a third gear train assembly allows selective engagement and disengagement of the output shaft with the first ring gear. Also provided is a fourth clutch means permitting selective engagement and disengagement of the fourth gear train with the output shaft. The transmission further comprises a drive engagement means for selectively engaging and disengaging the directional drive gear train assembly with the output shaft.

BRIEF DESCRIPTION OF THE DRAWINGS

FIG. 2 is a schematic arrangement of FIGS. 3, 4, 5, 6, 7 and 8 which depict in detail the various sections of the transmission and control system as depicted in FIG. 1.

DETAILED DESCRIPTION OF THE DRAWINGS

Figure 1:
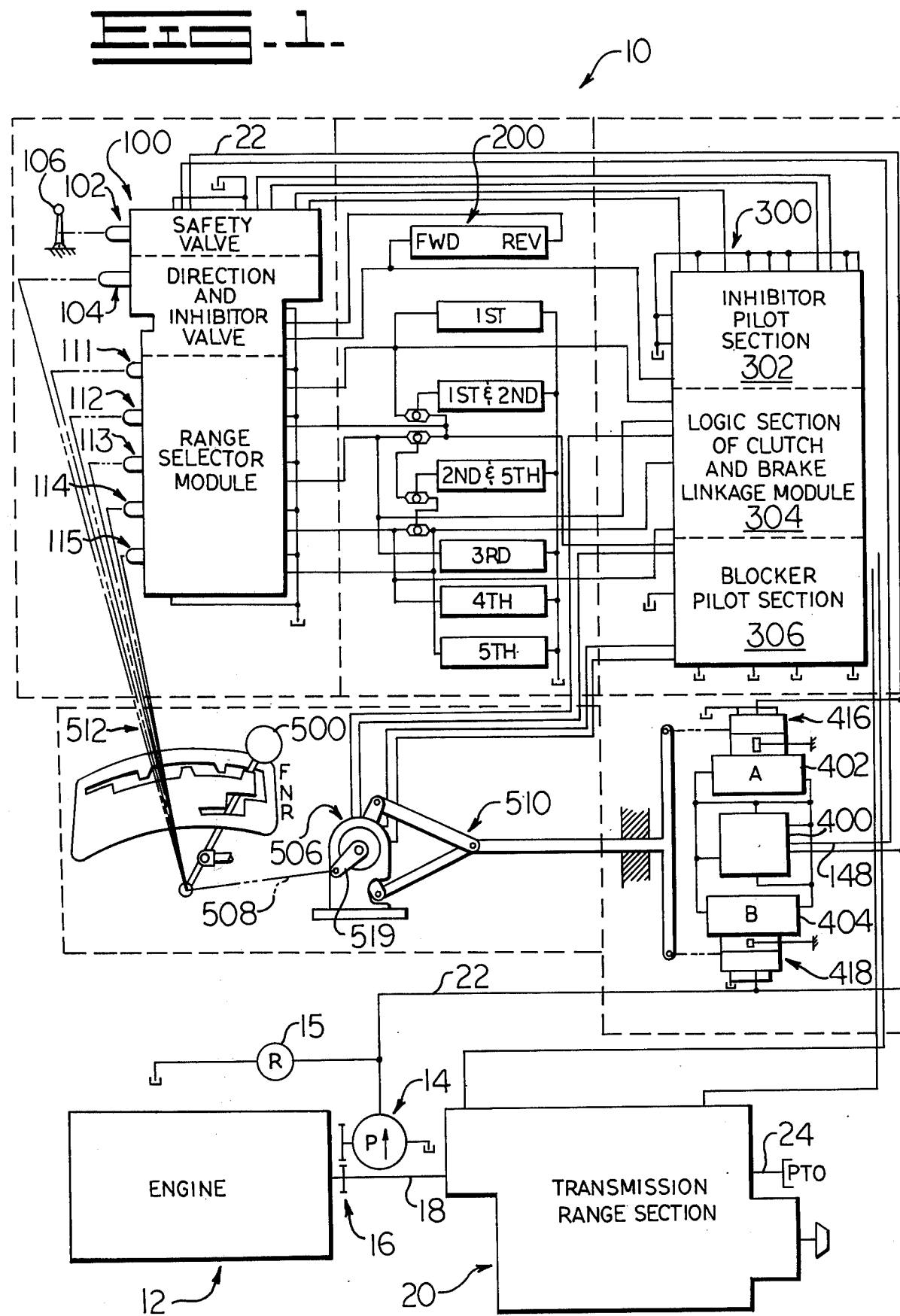
FIG. 1 shows a general schematic of the transmission and control system which is in the subject of this invention.

Referring to FIG. 1, a hydrostatic mechanical transmission and associated controls are shown at 10. An engine 12 drives a pump 14 through gearing 16. Input shaft 18 to transmission 20 is also driven by engine 12.

A conventional relief valve 15 is provided in main hydraulic supply conduit 22. Hydraulic supply conduit 22 supplies the control circuit shown in FIGS. 4, 5 and 6. In addition to supplying the control circuit, main hydraulic supply conduit 22 feeds a relief and replenishment system 400 shown in FIG. 7. Relief and replenishment system 400 is of a conventional design similar to that shown in U.S. Pat. No. 3,477,225. Such a relief and replenishment system provides a means or removing fluid from the hydraulic circuit and adding make-up fluid for cooling the transmission. In addition to supplying hydraulic fluid to hydrostatic unit A 402 and hydrostatic unit B 404, relief and replenishment system 400 as set forth in U.S. Pat. No. 3,477,225 provides a separate safety control which requires the operator's manipulation to close vent valves (not shown) to activate the transmission to a driving mode. Thus it is seen that one advantage of this invention is the provision that a single hydraulic system provides fluid to both the control system and the associated transmission torque transfer units.

Figure 3:
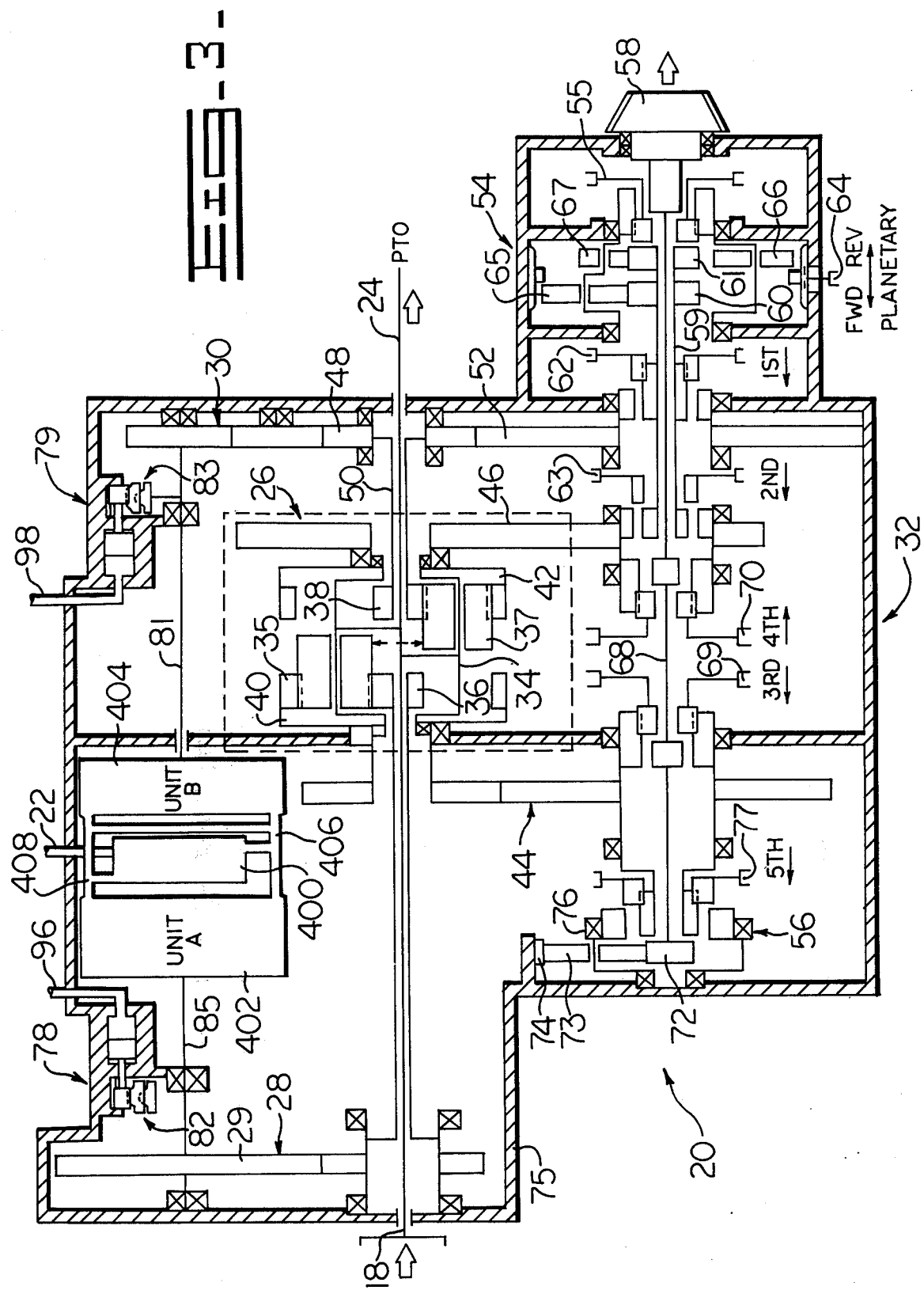
FIG. 3 is a schematic layout of the transmission.
Figure 4:
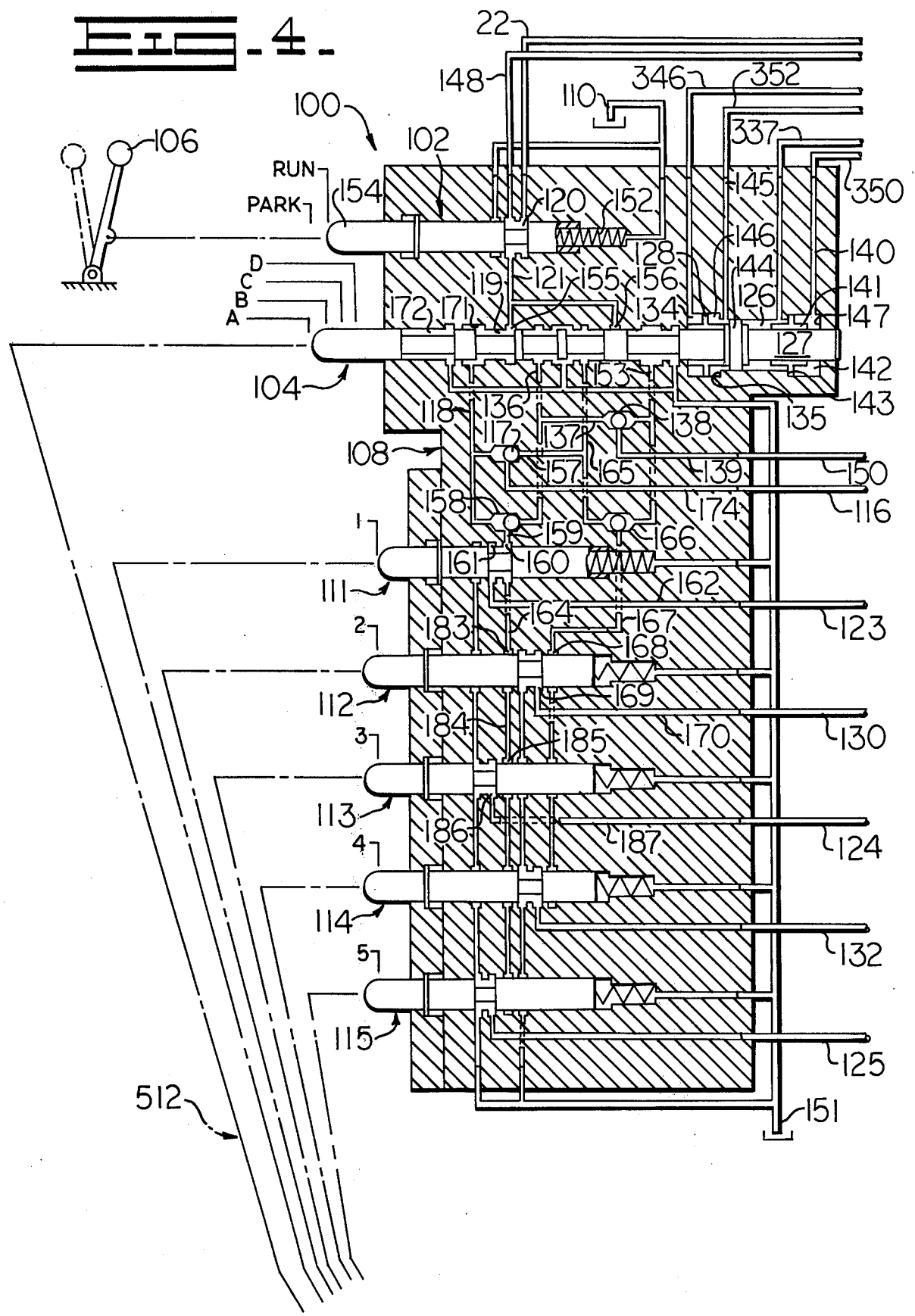
FIG. 4 is the range selector modular of the control system shown partly in section and partly schematically.
Figure 5:
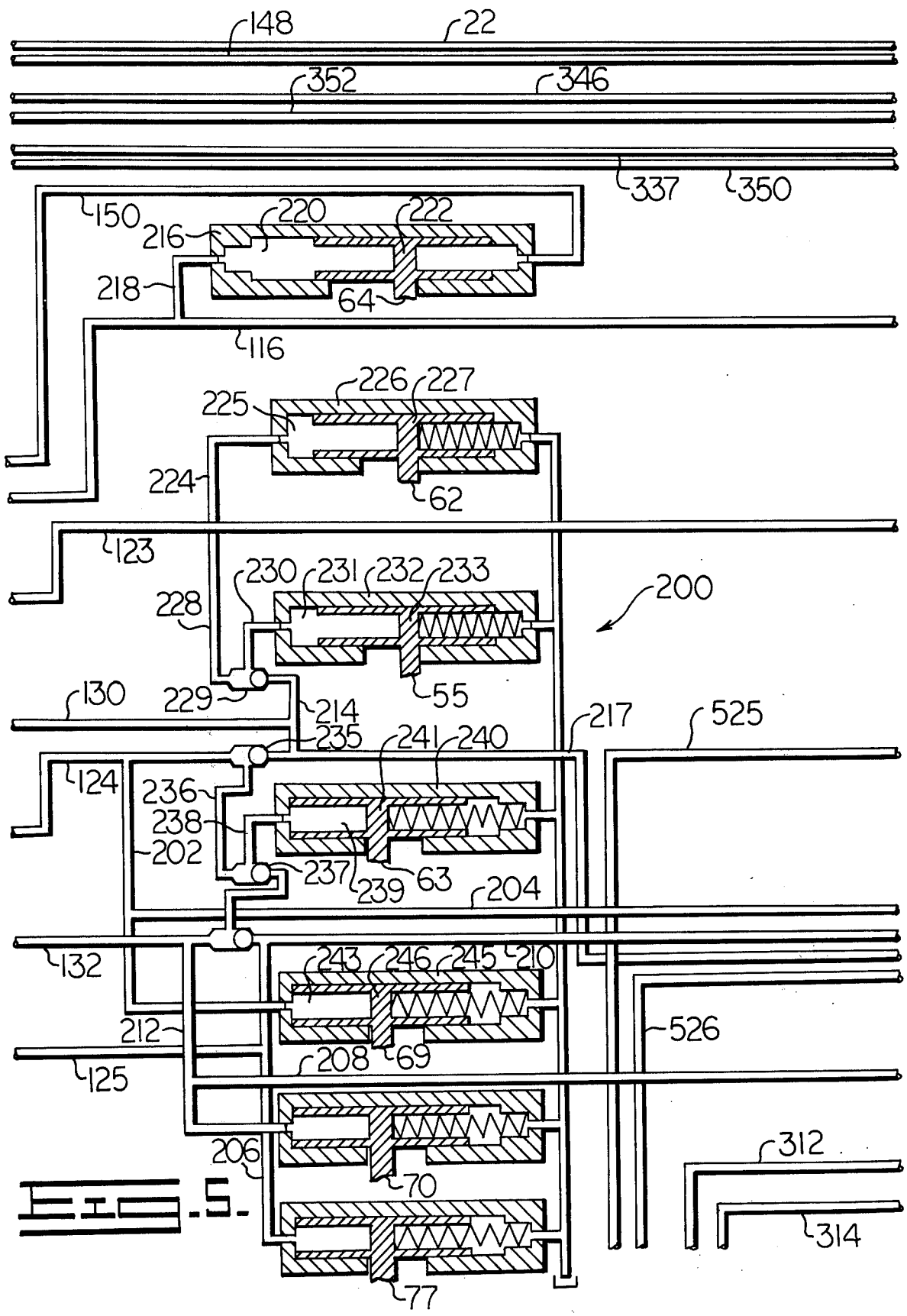
FIG. 5 is the actuator module of the control system shown partly in section and partly schematically.
Figure 6:
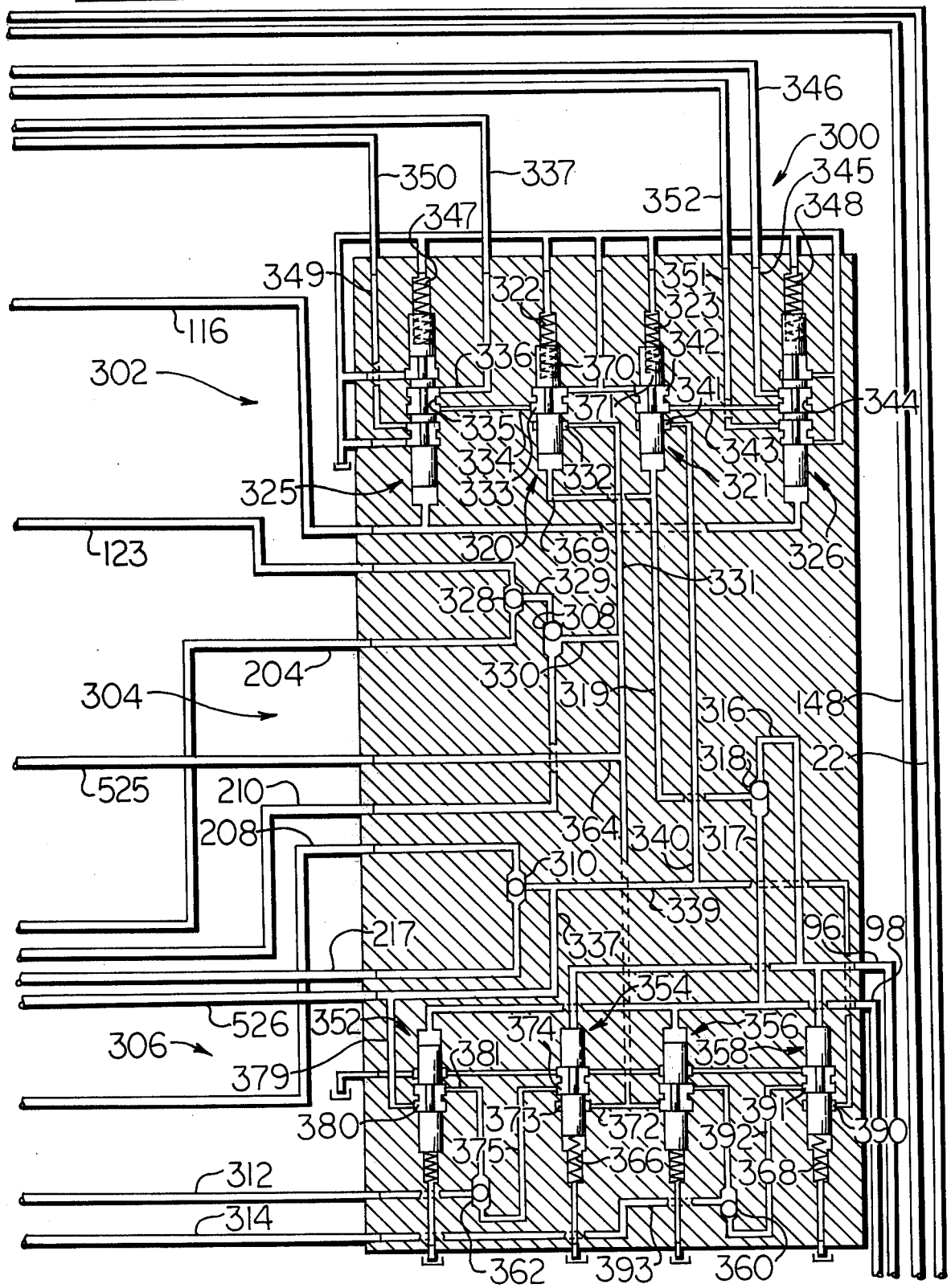
FIG. 6 is the brake and clutch link module shown partly in section and partly schematically.
Figure 7:
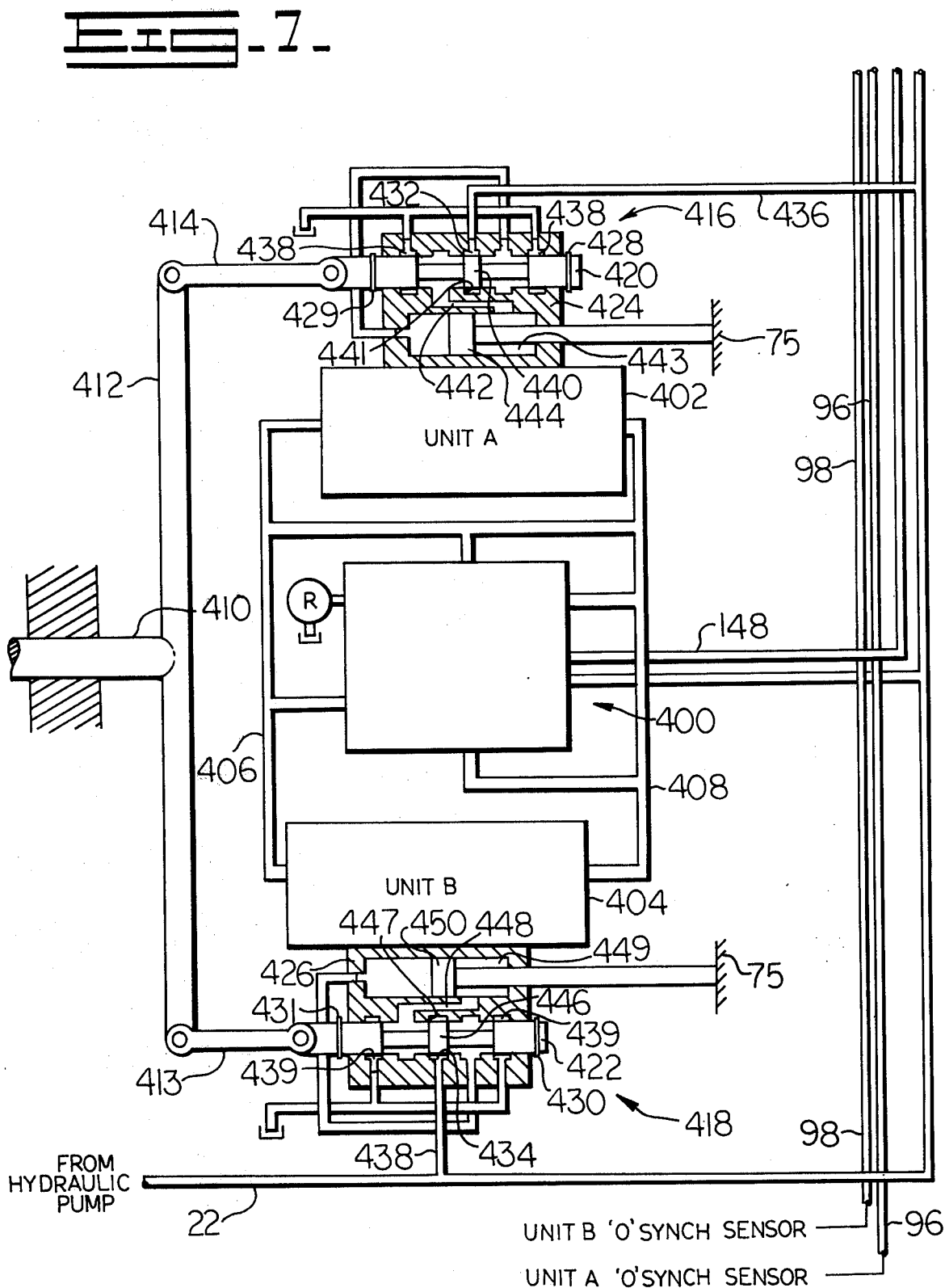
FIG. 7 schematically shows the stroking mechanism for the hydrostatic units.

For clarity's sake, the remainder of the discussion will be sectionalized covering first, the transmission 20, as illustrated in FIG. 3, followed by a discussion of the control system illustrated in FIGS. 4, 5 and 6 and the interaction of the control system with the hydrostatic drive units as illustrated in FIG. 7.

General Description of the Transmission

Referring to FIG. 3, the principal portions of transmission 20 comprise an engine-driven input shaft 18 and its power take-off extension shaft 24; a recycling planetary drive unit 26 (also illustrated in FIG. 13); hydrostatic unit A 402 and hydrostatic unit B 404 respectively in communication with first gear train 28 and second gear train 30; and range gear sets shown generally at 32.

Input shaft 18 drives a common planet carrier 34 of recycling planetary unit 26. Hydrostatic unit A 402 and hydrostatic unit B 404 are variable displacement hydrostatic devices hydraulically coupled together by conduits 406 and 408. Each device is able to act as a motor while the other device acts as a pump. Hydrostatic unit A 402 is driven through first gear train 28 by sun gear 36 of recycling planetary drive unit 26 when acting as a pump and conversely drives through first gear train 28 sun gear 36 when acting as a motor. Similarly, hydrostatic unit B 404 is driven through pinion 48 of second gear train 30 by sun gear 38 when acting as a pump and drives through pinion 48 of second gear train 30 sun gear 38 when acting as a motor. Ring gear 40 driving third gear train 44 and ring gear 42 driving fourth gear train 46 provide selective mechanical links to range gear sets 32.

Gear train 44 may be engaged with range gear sets 32 and thus output shaft 58 in the third range by clutch 69 and in the fifth range by clutch 77. Gear train 46 may be engaged with range gear sets 32 in the second range by clutch 63 and in the fourth range by clutch 70. When clutch 63 is engaged in the second range torque is provided to output shaft 58 through directional drive section 54 by engagement of clutch 55 and selection of a direction by engaging clutch means 64. Additionally, hydrostatic unit B 404 driving second gear train 30 may be coupled to range gears 32 for a first range through gear 52 by clutch 62.

Figure 13:
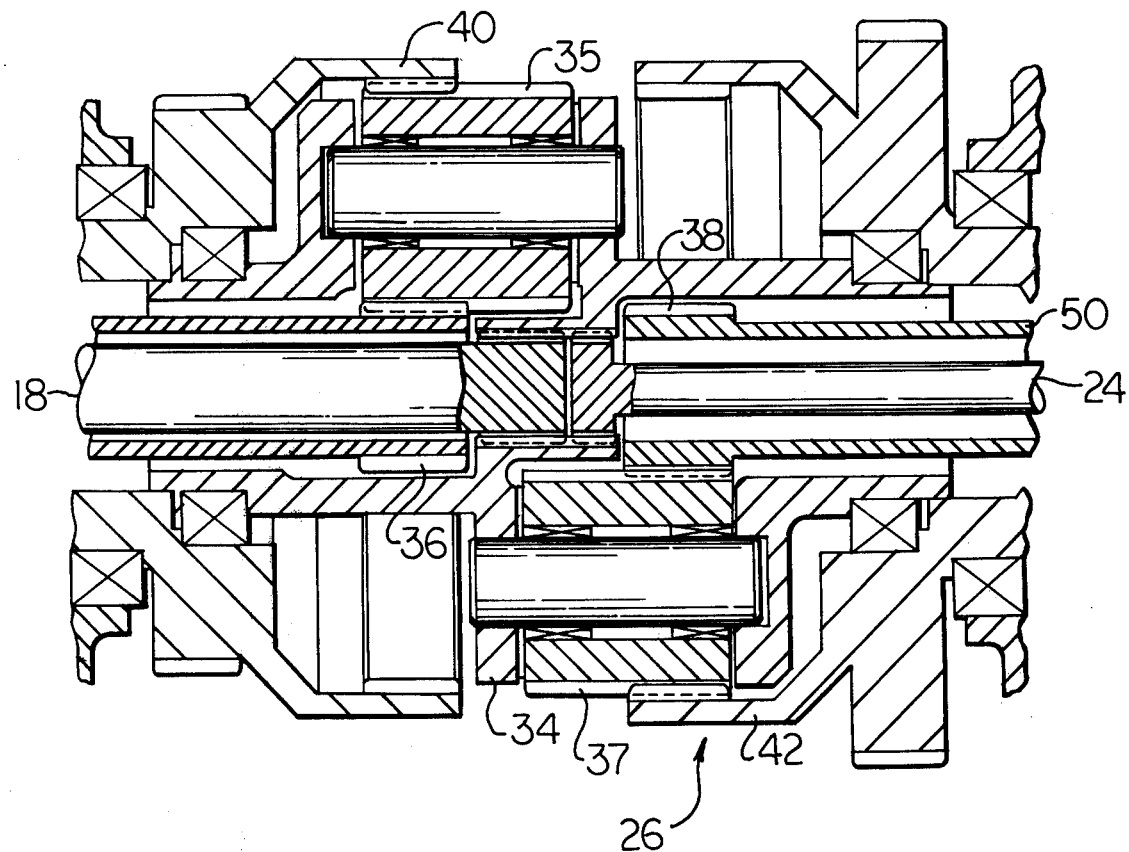
FIG. 13 is a view partly in cross-section of the recycling planetary gear arrangement.

Engagement of clutch 62 provides first range torque at output shaft 58 through directional drive section 54 by engagement of clutch 55 and selection of a direction by engaging clutch means 64. Pinion 48 is mounted on shaft 50 which also carries sun gear 38. Common planet carrier 34 carries a plurality of planet gears 35 intermeshing with ring gear 40 and sun gear 36 and a plurality of planet gears 37 intermeshing with ring gear 42 and sun gear 38. Planet gears 35 and planet gears 37 overlap and intermesh as shown in FIG. 13.

Thus, a split torque hydrostatic-mechanical drive unit is shown with selective direct coupling from one of the hydrostatic units, in this case hydrostatic unit B 404, to the range gear set 32. The purpose of this direct coupling of hydrostatic unit B 404 to range gears 32 will become evident in the subsequent discussion.

Range gear sets 32 depict generally provision for five forward gear ratios with a reverse capabiity in the first and second ratio. Specifically, directional drive section 54 provides torque to output shaft 58 through clutch 55. Power is provided to directional drive section 54 through hollow shaft 59, driving forward sun gear 60 and reverse sun gear 61. Hollow shaft 59 is driven in the first gear range by engagement of clutch 62 with gear 52 which is driven by pinion 48 of second gear train 30 and in the second gear range by engagement of clutch 63 with fourth gear train 46. Direction is obtained by engagement of clutch means 64 with the plurality of forward planet gears 65 for a forward direction and engagement with reverse planet gears 66 driven by a plurality of idler gears 67 for a reverse direction. Clutch means 64 comprises the ring gear of planetary directional drive section 54 acting as a nonrotating member slidably affixed to transmission casing 75.

Coaxially located with hollow shaft 59 is shaft 68. Shaft 68 passes through directional drive section 54 being an extension of output shaft 58. A third gear ratio is engaged with shaft 68 by means of clutch 69 engaging third gear train 44 therewith. A fourth gear ratio is provided by means of clutch 70 engaging shaft 68 with fourth gear train 46. The fifth gear ratio is provided by overdrive section 56. Overdrive section 56 is comprised of sun gear 72 mounted on shaft 68, planet gears 73 and ring gear 74 which is rigidly affixed to transmission casing 75. Engagement of overdrive section 56 is by means of clutch 77 which, when engaged, drivingly connects third gear train 44 through overdrive section 56 to shaft 68.

Figure 9:
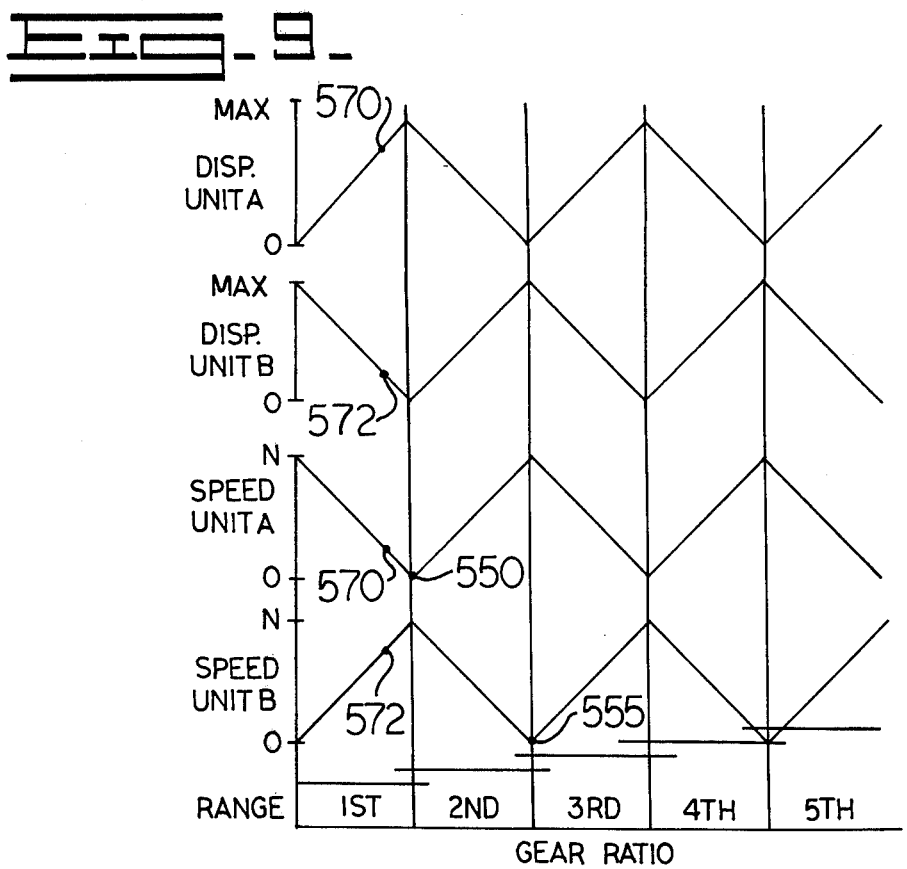
FIG. 9 is a graph illustrating the relation of speed to displacement of the hydrostatic units.

A more detailed description of operation of the transmission will follow after a discussion of the control system. However, for clarity's sake a generalized description of transmission operation follows: Power is suplied to recycling planetary drive unit 26 through shaft 18 from engine 12. Shaft 18 is drivingly connected to common planet carrier 34. In the neutral condition with all clutches in range gear sets 32 disengaged, and hydrostatic unit A 402 at zero displacement, hydrostatic unit B 404 at maximum diplacement as shown in FIG. 9, recycling planetary unit 26 will drive sun gear 36 which in turn drives hydrostatic unit A 402 through first gear train 28 at maximum speed while hydrostatic unit B 404, at maximum displacement, is at zero speed as shown in FIG. 9. Engagement of output shaft 58 by clutch 55 with directional drive section 54, engagement of hollow shaft 59 by clutch 62 with gear 52 and selection of a forward or reverse direction by clutch 64, provides a power train from hydrostatic unit B 404 to drive output shaft 58 through shaft 81, gear train 30, pinion 48, gear 52 and directional drive section 54. Subsequent stroking to increase displacement of hydrostatic unit A 402, the pump, with concurrent stroking to decrease displacement of hydrostatic unit B 404 as shown in FIG. 9, results in a delivery of torque through the above-described hydrostatic power train to output shaft 58. It should be noted that in this first gear selection, torque is initially delivered solely through hydrostatic units A 402 and B 404 thus avoiding start-up problems encountered in previous recycling split torque transmissions. As the speed of unit B 404 increases, mechanical transmission of torque through planets 37 to sun gear 38 and pinion 48 also increases while the transmission of hydrostatic torque through gear train 30 to pinion 48 decreases providing the constant output torque shown in FIG. 14. Concurrently ring gear 42 and gear train 46 are decreasing in speed while ring gear 40 and gear train 44 are increasing in speed. Up-shifting from first gear to second gear may be undertaken when gear train 46 and hollow shaft 59 are synchronized, and is accomplished by engagement of fourth gear train 46 with hollow shaft 59 by clutch 63, followed by disengagement of clutch 62 from gear 52. The synchronization and timing necessary for the engagement of clutch 63 and disengagement of clutch 62 will be discussed in greater detail in the discussion of the control system. Hydrostatic unit A 402 is prevented from reverse rotation by overrunning clutch 82 of zero speed sense unit 78, the construction of which will be discussed at a later period.

Concurrent with engagement of clutch 63 with fourth gear train 46 and the disengagement of clutch 62 with gear 52, the control system reverses the stroking of hydrostatic units A 402 and hydrostatic unit B 404. The speed of unit B 404 now acting as a pump, decreases while the speed of hydrostatic unit A 402 increases. Similarly, ring gear 42 and fourth gear train 46 are increasing in speed, while ring gear 40 and third gear train 44 are decreasing in speed. This continues until the speed of third gear train 44 attains a predetermined rotational relationship with the speed of shaft 68. Third range may then be selected by engagement of shaft 68 with third gear train 44 by clutch 69 at this synchronous speed point. The speed of hydrostatic unit B 404 then being zero, zero speed sense unit 79 will lock shaft 81 through means of an overrunning clutch 83 to transmission casing 75, thereby preventing shaft 81 from going beyond synchronizing speed.

Engagement of clutch 69 with third gear train 44 is followed by disengagement of clutch 63 from fourth gear train 46. Again, the roles of hydrostatic unit A 402 and hydrostatic unit B 404 are reversed, with unit A 402 being at zero displacement and acting as the pump. As the stroking of the hydrostatic units is accomplished in this third gear range, ring gear 40 increases in speed while ring gear 42 decreases in speed until such time as fourth gear train 46 is turning at synchronous speed with respect to output shaft 68. At this time, clutch 70 may be moved rightwardly to engage fourth gear train 46 through a fourth gear ratio shaft 68. The transition from fourth to fifth is essentially identical to that from second to third. Fifth range is accomplished by engaging clutch 77 to planet carrier 76 of overdrive section 56 to drive sun gear 72 which is integral with shaft 68, the reaction element, ring gear 74 being rigidly fixed to housing 75.

Figure 12:
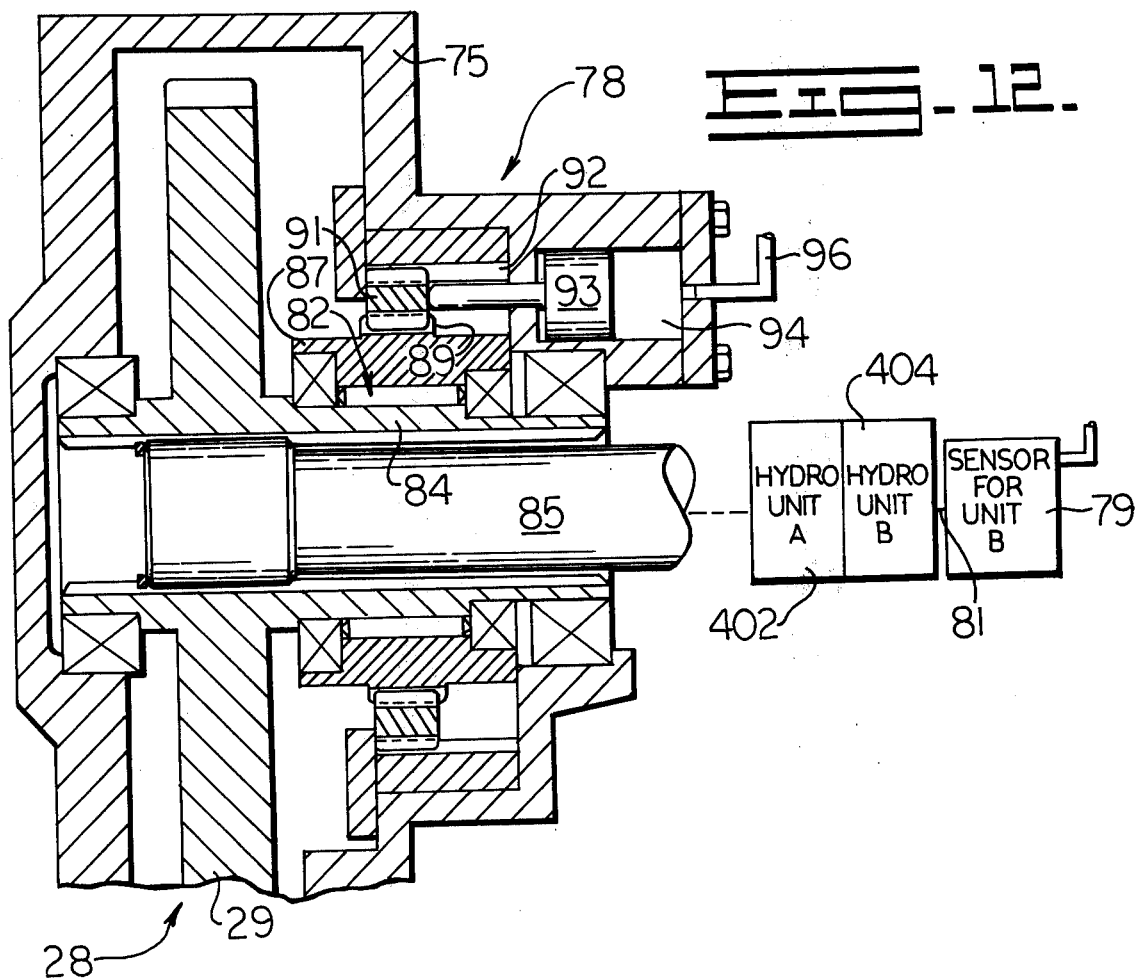
FIG. 12 is a view partly in cross-section of one of the zero speed sensing units for the hydrostatic drive section.

Shaft 85, which drives hydrostatic unit A 402, and shaft 81, which drives hydrostatic unit B 404, are provided with identical zero speed sense units 78 and 79, respectively. In addition to sensing a zero speed condition in hydrostatic unit A 402, or a zero speed in hydrostatic unit B 404, zero speed sensing units 78 and 79 are also provided with overrunning clutches 82 and 83, which limit rotation of shafts 85 and 81 to one direction. Referring to FIG. 12, zero speed sense unit 78 is shown in greater detail. Outer race 87 of overrunning clutch 82 is coaxially mounted on hub extension 84 of gear 29 of gear train 28, gear 29 being splined to shaft 85. Outer race 87 is provided with a helical spline 89 in communication with a gear 91 connected in turn to transmission housing 75 by a spur spline 92. At the start of second and fourth gear, when the speed of hydrostatic unit A 402 drops to the point of engagement of overrunning clutch 82, a thrust is exerted through helical spline 89 and gear 91 to move a piston 93 rightwardly and send a hydraulic signal from a pressurized chamber 94 to the control system via a conduit 96. Receipt of this signal by the control system will be described later. Chamber 94 is initially pressurized to a low value and only a small movement of piston 93 is required to send a relatively high pressure signal to the control system.

Finally, gear train 46 may be deliberately rationed for approximately 5 to 50 rpm beyond a zero synchronous signal for the purpose of insuring that clutches 63, 69, 70 and 77 will engage with no butting of the splines; and after engagement of the particular clutch, inner race 84 will free-wheel, causing gear 29 to roll slowly forward.

General Description of the Hydraulic Controls

The control system is supplied with fluid by a hydraulic pump 14, as shown in FIG. 1, which is driven by engine 12 and relieved by a conventional relief valve 15. The controls generally consist of lever 500 which, through control means 508, brake and clutch means 506 and lever means 510, mechanically controls servo valves 416 and 418 which in turn control the displacement of hydrostatic units A 402 and B 404, and through linkage means 512 controls range selector module 100.

The mechanical linkage is limited and inhibited in its movement by brake and clutch means 506 (see FIG. 11) wherein a downshift blocking brake 502 and an upshift blocking brake 504 are designed to eliminate any unnecessary change in direction of recycling planetary drive unit 26. That is, when upshifting and upon reaching the next zero synchronizing point, the operator cannot continue to stroke the hydrostatic units, which would result in a reversal of direction of the driving sun gear, until he signals to make a range shift. This will become more apparent at a later point in the specification. A hydrostatic unit stroke control clutch means 514 of brake and clutch means 506 properly coordinates the change in displacement of the two hydrostatic units. The function and operation of this hydrostatic unit stroke control clutch means 514 will also become more apparent as the specification continues.

Range selector module 100 (FIG. 4) is supplied with fluid from pump 14 by conduit 22. Separately controlled safety valve 102 connects supply conduit 22 to a directional spool valve 104 when control lever 106 is moved at the operator's console. Control lever 106 has two positions "Park" and "Run", being shown in the "Run" position in FIG. 4. Fluid passes through appropriate porting in the directional spool valve 104 to supply a series of check valves 108 and a plurality of range selector valves 111, 112, 113, 114, and 115. The desire range selector valve, when moved longitudinally by linkage means 512, communicates fluid pressure to the appropriate actuators 200, shown in FIG. 5, which in turn engage the desired clutch 55, 64, 62, 63, 69, 70, or 77 (see FIG. 3) as described in the description of the transmission above.

The range selector valve signal also activates certain valves in the clutch and brake linkage module 300 shown in FIG. 6. The clutch and brake linkage module may be subdivided into three sections: an inhibitor pilot section 302, a clutch and brake logic section 304, and a sensor pilot section 306. Sensor pilot section 306 also receives the pressure signal described above from one of the two zero speed sense units 78 and 79 through conduits 96 and 98, which indicate a zero speed condition of hydrostatic unit A 402 or hydrostatic unit B 404. (FIG. 3).

Referring again to FIG. 4 and as noted above, safety valve 102 of range selector module 100 receives supply fluid via conduit 22 and is vented at drain 110 when in the Park position. A spring 152 biases safety valve spool 154 leftwardly into a Park position which shuts off all supply to directional spool valve 104. The operator must move lever 106 to the Run position, forcing safety valve spool 154 to the right against spring bias to the position shown in FIG. 4 to provide fluid pressure to directional spool valve 104, range selector valves 111, 112, 113, 114 and 115, and conduit 148 which supplies fluid pressure to close vent valves in relief and replenishment system 400 (FIG. 7). Relief and replenishment system 400 provides fluid to hydrostatic unit A 402 and hydrostatic unit B 404, as described above.

Mechanical Linkage to the Hydrostatic Units

Figure 8:
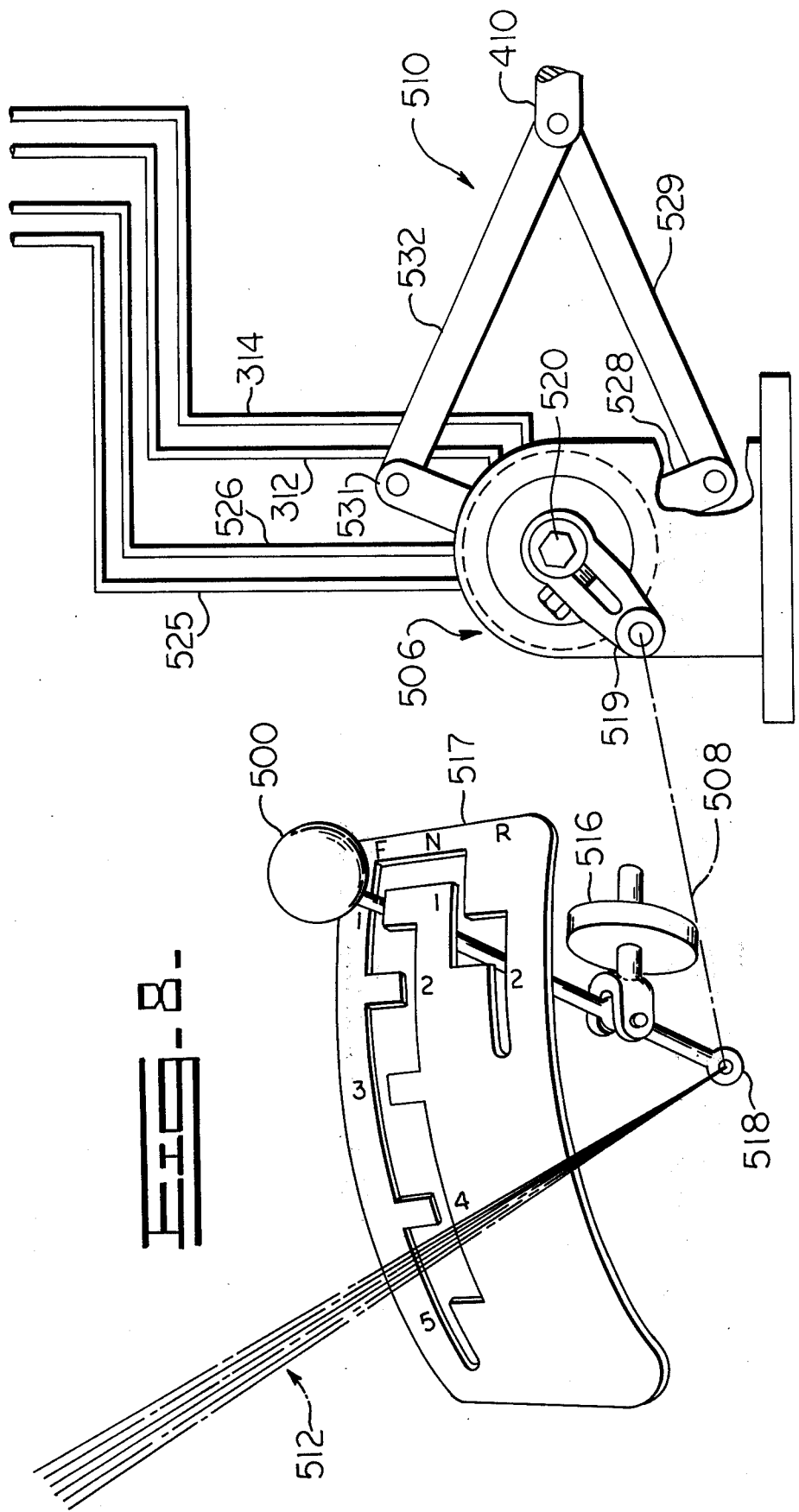
FIG. 8 is the control linkage shown partly schematically.
Figure 11:
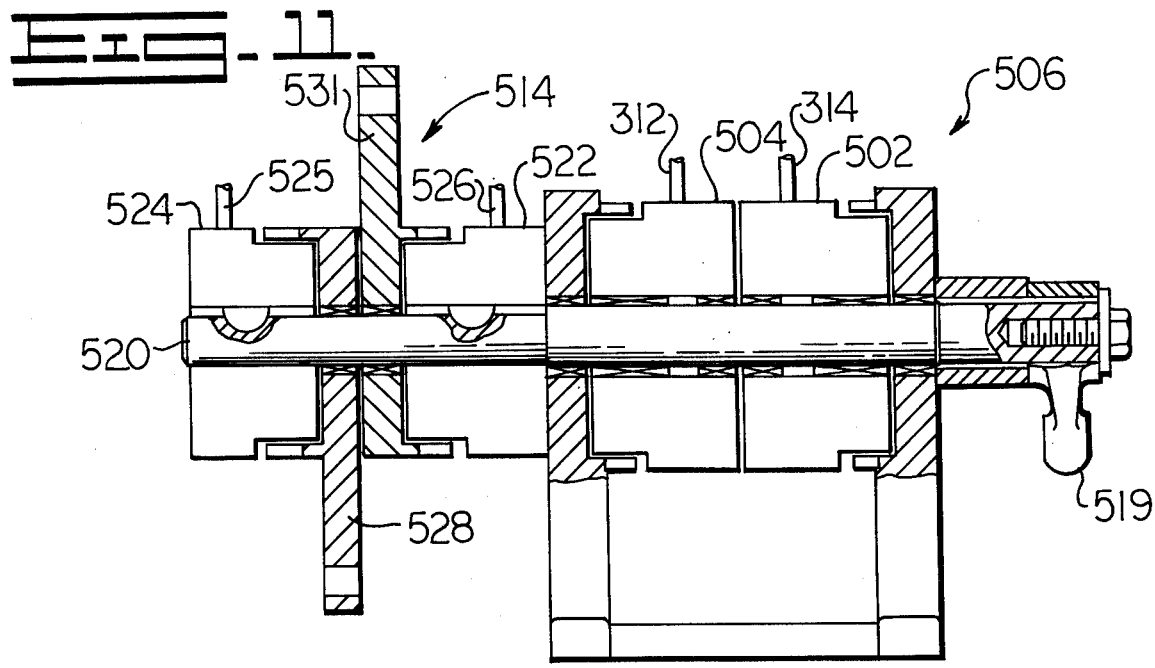
FIG. 11 is an elevational view partly in cross-section of the manual blocker brakes and clutches in the control system for the servo valves which determine the stroke of the hydrostatic units. The same unit is shown in end view in FIG. 8.

Referring to FIG. 8, the manual shift lever 500 is pivotally mounted at double acting joint 516 which is affixed to the vehicle frame. Shift lever 500 is fitted in gated indicator plate 517 at the upper end and connected at lower end 518 to hydrostatic unit control means 506 by control means 508, as well as to range selector module 100 by linkage means 512. Lower end 518 is connected by control means 508 through arm 519 to control shaft 520 (FIG. 11) which moves only counterclockwise while upshifting and only clockwise while downshifting. During upshifting, shaft 410 which links brake and clutch means 506 with hydrostatic units A 402 and B 404 receives axial movement rightwardly and leftwardly as controlled by clutches 522 and 524 (FIG. 11). These clutches receive their actuation signals (through a ball check valve 308 in clutch and brake logic section 304 (to be described later) shown in FIG. 6 in ranges 1, 3 and 5 and a ball check valve 310 in ranges 2 and 4) depending upon the particular requirements for the displacement stroking of hydrostatic unit A 402 and hydrostatic unit B 404. For example, if the lever 500 is in the gating 517 as shown in FIG. 8 and the transmission is upshifting in first range forward, arm 519 and shaft 520 (FIG. 11) are rotated counterclockwise by means of linkage 508. The displacement and speed of the hydrostatic units when lever 500 is at 500-7 is represented by points 570 and 572 in FIG. 9. A pressure signal in conduit 525 engages clutch 524 (FIG. 11) which connects shaft 520 to lever 528. Lever 528 rotates counterclockwise to push link 529 and shaft 410 rightwardly. Referring to FIG. 7, this rightward movement of shaft 410 shifts cross arm 412 rightwardly. Thus, through link 413 servo valve 148 on hydrostatic unit B 404 is moved from maximum towards zero displacement while at the same time through link 414 servo valve 416 on hydrostatic unit A 402 is moved from zero towards maximum displacement (see FIG. 9 for displacement plot). This same action is provided in the first, third, and fifth ranges. If clutch 522 (FIG. 11) is engaged via a signal in conduit 526, and shaft 520 is rotating counterclockwise in the upshift direction, as before, lever 531 pulls link 532 and shaft 410 leftwardly to apply opposite stroking of hydrostatic units A 402 and B 404 in ranges two and four. While downshifting, arm 519 rotates in a clockwise direction when viewed as shown in FIG. 8, and all motions of shaft 410 and consequently hydrostatic units A 402 and B 404 are reversed.

Stroking of the Hydrostatic Units

The above described motions of shaft 410 in the upshifting periods and the blocker influence on shaft 410 in the transient periods (to be described later), are reflected in the operation of the hydrostatic units A 402 and B 404. Referring to FIG. 7, cross member 412 integral with shaft 410 extends outward to servo control valve 416 for hydrostatic unit A 402 and servo control valve 418 for hydrostatic unit B 404, the servo control valves being integrally mounted with unit A and B. At the extremities of cross member 412, link 414 and link 413 connect control spool 420 and control spool 422, respectively. Control spool 420 and control spool 422 are limited in leftward travel by lock ring 428 and lock ring 430, respectively, while rightward travel of spool 420 is limited by lock ring 429 and rightward travel of spool 422 is limited by lock ring 431. Servo housings 424 and 426 are supplied with system pressure from conduit 22 via branch conduits 436 and 438. Branch conduit 436 provides fluid pressure at annulus 432 in housing 424, while branch conduit 438 provides fluid pressure at annulus 434 in housing 426. FLuid pressure is drained from housing 424 by identical annuli 438 located near the ends of housing 424, similarly identical annuli 439 in housing 426 provide drains for fluid pressure therein. When cross member 412 is displaced rightwardly, land 440 opens metering edge 441 of annulus 432 permitting fluid pressure to pass through passage 442 into chamber 443 acting upon piston 444 the rod end of which is rigidly fixed to housing 75 of transmission 20, resulting in a change of displacement in hydrostatic unit A 402 from zero toward maximum. Simultaneously, such rightward movement of cross member 412 shifts servo piston 422 rightwardly thereby permitting land 446 to meter fluid pressure past metering edge 447 into passage 448 and thence chamber 449 to act against piston 450 also rigidly fixed to housing 75 thereby changing the displacement of hydrostatic unit B 404 from maximum toward zero. Movement of servo housing 424 and 426 ceases when lands 440 and 446, respectively, close metering edges 441 and 447.

Leftward movement of cross member 412 caused by a downshift motion on lever 500 will result in the opposite reaction in grounded pistons 444 and 450, causing displacement of hydrostatic unit A 402 to move toward a zero displacement condition and for hydrostatic unit B 404 to move toward a maximum displacement condition.

Control Lever Operations and Restrictions

Figure 10:
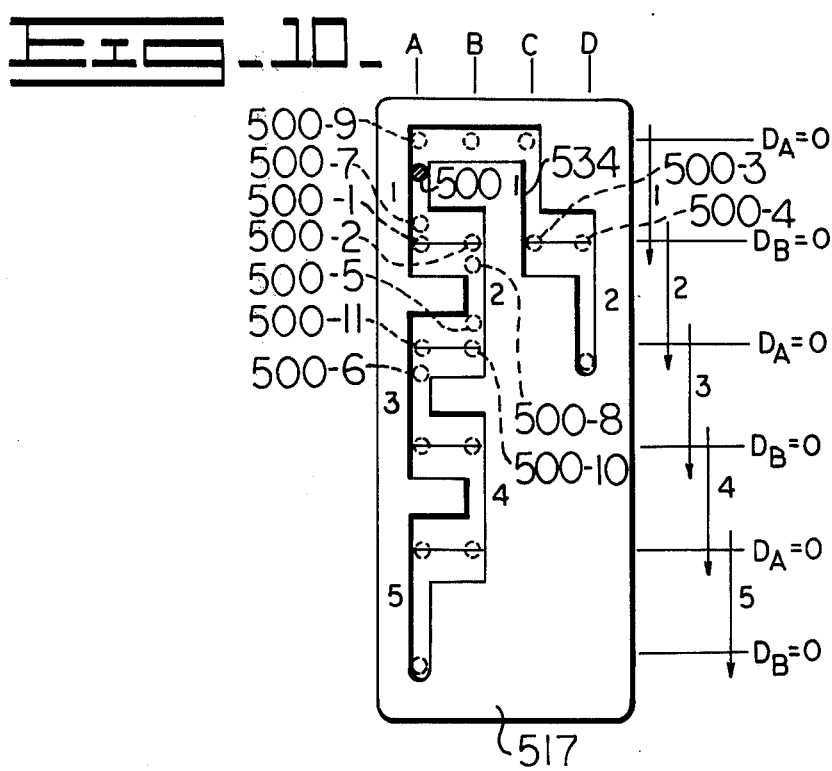
FIG. 10 shows a plan view of the control lever gate depicted in perspective in FIG. 8.

Referring to FIG. 10, the operator has under his control a control lever 500 which is positionable in gated plate 517. Control lever 500 may be moved transversely from the left side of gated plate 517 to the right side of gated plate 517. For convenience the left side of gated plate 517 will be denoted by the letter A and the right side by the letter D with two intermediate positions B and C, B being adjacent to A, and C being adjacent to D. Such transverse movement of control lever 500 is transmitted through linkage means 512 to range selector module 100 for the ultimate purpose of engaging appropriate clutches in the range gear sets 32. Movement of lever 500 in the vertical direction as depicted in FIG. 10 varies the displacement of hydrostatic unit A 402 and hydrostatic unit B 404 through brake and clutch means 506 as described above. Gated plate 517 in conjunction with hydraulically actuated stops in range module 100 (to be discussed later) and downshift blocking brake 502 and upshift blocking brake 504 in brake and clutch means 506 serve to prevent the operator from upshifting from one gear ratio to another gear ratio before the appropriate hydrostatic unit has reached a zero speed condition, and further serve to prevent over-stroking of the hydrostatic units. These functions will become more apparent as the various elements of the control system are discussed.

During the shift transient period, that is while a new gear ratio is being engaged in range gear sets 32 (FIG. 1), shaft 520 (FIG. 11) is blocked from rotating in a manner contrary to the signal in either clutch 524 or 522. Blocker brakes 502 and 504 which prevent over-stroking are signalled via conduits 314 or 312, respectively, from sensor pilot section 306 (FIG. 6). Brakes 502 ansd 504 (FIG. 11) are functional during transverse movements of lever 500 when the speed of one or the other of the hydrostatic units A 402 or B 404 is at zero in the transient path between gear change, for example, between lever positions 500-1 and 500-2 or between lever positions 500-3 and 500-4, as indicated in FIG. 10. When upshifting in the transient path, that is, between positions 500-1 and 500-2, upshift blocking brake 504 (comprising a one-way brake) is actuated to stop counterclockwise rotation of shaft 520. Conversely, when downshifting in the transient path, for example between positions 500-2 and 500-1, brake 502 is actuated to stop clockwise rotation of shaft 520.

Control Lever Inhibitor Function

Inhibiting forces are provided to lever 500 in the gating at positions corresponding to A, B, C, and D. These lever inhibitor forces are required to prevent operators from shifting across the gating for example, from position 500-5 to 500-6 (FIG. 10) before the appropriate hydrostatic unit, in this case hydrostatic unit B 404 has reached a zero speed and is prepared for a range shift. These four positions, A, B, C, and D are also reflected in FIG. 4 to denote the four positions that directional spool valve 104 may take. Establishment of the inhibiting forces is accomplished in the following manner. During the zero sense signal period (i.e. when one of the hydrostatic units is at zero speed), spool 370 of spool valve 320 and spool 371 of spool valve 321 (FIG. 6) are forced upwardly upon receipt of the zero sense signal from either zero sense unit 78 or 79 (FIG. 3) through either conduit 98 or 96, branch passage 317 or 316 to ball check valve 318 thence via passage 319. Spring bias 322 and spring bias 323 will bottom valves 320 and 321 upon termination of the zero sense signal. Bottoming of valves 320 and 321 will permit signals from clutch and brake logic section 304 to be translated by valves 325 and 326, valves 325 and 326 having been urged upwardly by fluid pressure in conduit 116 received from check valve 117 (FIG. 4). In the first gating position A, in first, third and fifth range forward, as shown in FIG. 10, the signal to be translated by valve 325 is received at ball check valve 308 in brake and clutch module 300 (FIG. 6) by means of conduit 123 in the first range, conduit 204 in the third range, or conduit 210 in the fifth range. The origin of this signal at ball check valve 308 at range selector module 100 in FIG. 4, will become obvious in the discussion of the operation of first range forward. Pressure is transmitted from ball check valve 308 by passage 330 to passage 331 then annulus 332 of spool valve 320 to annulus 333, passage 334 to chamber 335 of valve 325 thence passage 336 to conduit 337. The signal is received at chamber 126 (FIG. 4) in directional spool valve 104. Pressure in chamber 126 acts against piston portion 144 of spool 127 to force spool 127 leftwardly against spacer piston 128 slidably mounted on spool 127 thus holding directional spool valve 104 in the leftward lateral position A as shown.

With control lever 500 in the second gating position B, the second and fourth ranges, a signal is received at ball check valve 310 (FIG. 6) via conduit 216 in the second range or conduit 208 in the fourth range. Again these signals have their origin in range selector module 100. Fluid pressure is transmitted from ball check valve 310 via passage 339, branch passage 340 to annulus 341 of spool valve 321, thence annulus 342 of spool valve 321, passage 343 to chamber 344 of valve 326. From chamber 344 pressure is transmitted by a passage 345, conduit 346 to chamber 134 (FIG. 4) of directional spool valve 104 forcing spacer piston 128 rightwardly against shoulder 135 thereby limiting leftward travel of directional spool valve 104 and inhibiting leftward movement of lever 500 in FIG. 8.

Positioning lever 500 in gating position C, as shown in FIG. 10, reflecting the first reverse range, relieves pressure in conduit 116 leading to valves 325 and 326 in brake and clutch module 300 (FIG. 6). Relief of pressure in conduit 116 accomplished by positioning lever 500 in gating position C and resulting in movement of directional spool valve 104 (FIG. 4) rightwardly to position C directs fluid pressure from source conduit 22 to passage 136 instead of passage 118, ball check valve 117 and conduit 116. Relief of pressure in conduit 116 results in valves 325 and 326 (FIG. 6) being biased downwardly by spring bias 347 and 348, respectively. As noted above, in the first range, pressure is received in brake and clutch module 300 (FIG. 6) at ball check valve 308. Such pressure is communicated through passage 330, passage 331 and thence to annulus 332 of spool valve 320. Upon termination of a zero speed signal from zero speed sense units 78 or zero speed sense unit 79 (FIG. 3), valves 320 and 321 (FIG. 6) are spring biased downwardly, whereby pressure is transmitted to annulus 333 of valve 320, passage 334, chamber 335 of valve 325, thence passage 349 and conduit 350. Referring to FIG. 4, fluid pressure in conduit 350 is communicated through passage 140, thence to chamber 142 of directional spool valve 104 forcing spacer piston 141 leftwardly against shoulder 143 thereby preventing further rightward travel by directional spool valve 104 by means of piston portion 144 abutting spacer piston 141. Leftward travel of lever 500 is restricted by edge 534 of gate 517.

When lever control 500 is in the fourth gating position D, the condition of valves 325, 320, 321 and 326 (FIG. 6) remains the same as in gating position C described above. Thus a signal received through conduit 216 from selection of a second range at ball check valve 310 is communicated through passage 339, passage 340 to annulus 341 of spool valve 321. Pressure is further communicated to annulus 342, passage 343, chamber 344 of valve 326, passage 351 and thence conduit 352. Referring to FIG. 4, pressure is communicated through passage 352 to passage 145, thence chamber 146 of directional spool valve 104, thus acting against piston portion 144 of spool 127 forcing directional spool valve 104 to its rightward most position abutting spacer piston 143 which has bottomed on housing 147.

Thus it is apparent that whenever there is no signal from zero speed sense unit 78 or zero speed sense unit 79, an inhibiting force is on shift lever 500 (regardless of the range selection) so that it may not be moved laterally. Therefore, the only time the operator may shift from one gear range to the next gear ragne is when a zero speed indication has been received at spool valves 320 and 321 forcing spools 370 and 371 upwardly to block transmission of pressure which would inhibit movement of directional spool valve 104.

Overlap of Ranges

The control end 518 of lever 500 in FIG. 5 moves linkage means 512 to control two reverse ranges and five forward ranges. The linkage is so arranged as to provide a full rightward movement of any one of range selector valves 111, 112, 113, 114, or 115 against its individual spring bias and to pick up the next higher range selector valve in the latter portion of the control lever movement before releasing the lower range. For example, selector valve 111 (FIG. 4) is moved rightwardly by linkage 512 while in the first range. At approximately the middle of the range when shift control lever is approximately at position 500-7 in FIG. 10, linkage 512 will position range selector 112 (FIG. 4) rightwardly. At the end of the first range, that is, when lever 500 reaches position 500-8 in FIG. 10, selector valve 111 in FIG. 4 is released, the spring bias moving it leftwardly. This overlap zone may be seen in FIG. 10 wherein arrow 2 overlaps arrow 1, similarly arrow 3 overlaps arrow 2, 4 overlaps 3 and arrow 5 overlaps arrow 4. This overlap insures that the next desired range selector valve is engaged before the last range selector valve is disengaged. However, it should be noted that fluid pressure is not delivered to the next higher selector valve until lever 500 is shifted transversely to reposition directional selector valve 104.

Operation of Brake and Clutch Linkage Control

The recycling planetary group and particulary the associated transfer gearing to hydrostatic unit A 402 via sun gear 36 (FIG. 3) rotates in one direction at all times and increases or decreases in speed through the ranges. Rather sophisticated controls are required to insure synchronization of this group at the shift transient. This is accomplished mainly in the clutch and brake logic section 304 and sensor pilot section 306 of brake and clutch link module 300 (FIG. 6). As described above, brake and clutch link module 300 comprises three sections, inhibitor pilot section 302 which has been described in the discussion of inhibitor forces on control lever 500, the clutch and brake logic section 304 comprising a plurality of two-way ball check valves 308, 310, and 328 which receive signals from range selector module 100 through actuator module 200 and ball check valve 318 which receives signals from zero sense units 78 and 79. Sensor pilot section 306 is comprised of valves 352, 354, 356, and 358, and ball check valves 360 and 362 and the associated passages. This section may best be described by the operation of a given sequence in any given range caused by movement of lever 500.

Description of First Range Forward

Movement by the operator of safety valve 102 prior to start up communicates fluid from supply conduit 22 to close a vent piston (not shown) of relief and replenishment system 400 (FIG. 7) by conduit 148 thereby providing fluid pressure of the hydrostatic units. Fluid pressure is also directed from safety valve 102 to passage 121 and thence to annulus 155 and annulus 156 in directional valve 104. Control lever 500 is positioned at location 500-9 in the gating shown in FIG. 10 to select first range forward. Fluid pressure in annulus 155 is communicated to chamber 119 and thence through passage 118 to ball check valve 117 which is forced rightwardly to close off passage 157 and direct fluid to conduit 116 via passage 174. Fluid is communicated to branch conduit 218 (FIG. 5) and thence to chamber 220 and reverse actuator 216 thus forcing piston 222 rightwardly and engaging clutch 64 with forward planet gears 65 (FIG. 3).

Working pressure in passage 118 (FIG. 4) also forces ball check valve 158 rightwardly opening passage 159 to annulus 160 of speed selector valve 111, speed selector valve 111 having been displaced rightwardly by the positioning of control lever 500, fluid pressure is further communicated to annulus 161 thence passage 162 to conduit 123 branching to conduits 224 and 228 in FIG. 5. Fluid pressure in conduit 224 is communicated to chamber 225 of first range actuator 226 forcing piston 227 rightwardly thus engaging clutch 62 (FIG. 3). Engagement of clutch 62 connects gear 52 which is driven by hydrostatic unit B 404 through second gear train 30 to hollow shaft 59.

Referring again to FIG. 5, fluid pressure in conduit 228 forces ball check valve 229 rightwardly communicating fluid pressure through conduit 230 to chamber 231 of first and second range actuator 232 forcing piston 233 rightwardly. Movement of piston 233 rightwardly engages directional drive section 54 (FIG. 3) with output shaft 58 by means of clutch 55.

Fluid pressure in conduit 123 is also communicated to ball check valve 328 in brake and clutch link module 300 (FIG. 6). As described above, fluid is further communicated through passage 329 by ball check valve 308, passage 330 to passage 331 to valve 320 for the inhibitor function described above, and to conduit 525 via junction 364 and thence to clutch 524 of brake and clutch means 506 (FIG. 11) and thus control the linkage of servo valves 416 and servo valve 418 (FIG. 7) as described above.

When the speed of hydrostatic unit A 402 reaches zero as illustrated at point 550 in FIG. 9, a pressure signal in conduit 96 (FIG. 12) is transmitted to brake and clutch link module 300 (FIG. 6). Referring to FIG. 6, the pressure signal in conduit 96 (FIG. 6). Referring to FIG. 6, the pressure signal in conduit 96 forces valve 354 and valve 358 downwardly against spring bias 366 and 368, respectively. Concurrently, fluid pressure in conduit 96 is transmitted through passage 316 via ball check valve 318, passage 319 and passage 369 to valves 320 and 321 forcing spool 370 upwardly against spring bias 322 and spool 377 upwardly against spring bias 323 to the position indicated in FIG. 6. Movement of valves 320 and 321 relieves the inhibitor function such that control lever 500 may be repositioned in the next higher range in this case, the second range.

Working pressure in passage 331 is communicated via passage 372 to annulus 373 of valve 354 and thence annulus 374 to passage 375. Pressure in passage 375 is further communicated through ball check valve 362 to conduit 312 and thence to upshift blocking brake 504 to prohibit overstroking of hydrostatic unit A 402 by control lever 500 through control means 508 rotating arm 519 further in a counterclockwise direction. The operator at this time has the choice of moving control lever 500 upwardly in gate 517 toward position 500-9 as illustrated in FIG. 10 or rightwardly to position 500-2 thus shifting to the second ratio. Such shift to the second ratio is not inhibited because of the movement of spool 370 upwardly in inhibitor pilot section 302, as shown in FIG. 6.

Upshifting to the Second Gear Ratio

Range selector valve 112 may be moved rightwardly upon passage of lever 500 through position 500-7 (FIG. 10) thus insuring that engagement of the second gear range set may be accomplished without delay upon disengagement of the first gear range set. Movement by the operator of control lever 500 across gate 517 from position 500-1 to 500-2 accomplishes the following. Directional valve 104 is shifted rightwardly to position B thereby permitting fluid pressure to pass from annulus 156 to passage 165 thence to ball check valve 166 and on to passage 167. Simultaneously passage 118 is opened to chamber 172 and thence to drain 151. Pressurization of passage 165 shifts ball check valve 117 leftwardly through fluid pressure communicated in passage 157 thus retaining fluid pressure in conduit 116 which in turn insures the continued engagement of clutch 64, and the pressurization on valves 325 and 326. However, pressure in conduit 123 which has engaged clutch 62 is relieved through passage 118 via annulus 171, chamber 172 to drain 151. Meanwhile, pressure at ball check valve 166 is transmitted through passage 167 to annulus 168 of selector valve 112 and thence to annulus 169. Fluid pressure at annulus 169 pressurizes passage 170 and conduit 130 which branches to conduit 214 (FIG. 5). Fluid pressure in conduit 214 shifts ball check valve 229 leftwardly thereby maintaining the pressure in conduit 230 and chamber 231 insuring that clutch 55 in range gear set 32 (FIG. 3) remains engaged. Pressure in conduit 214 is further communicated through ball check valve 235 to conduit 236, ball check valve 237 and conduit 238 pressurizing chamber 239 in second range actuator 240 forcing piston 241 rightwardly to engage clutch 63 of range gear set 32 (FIG. 3). Simultaneously, pressure in conduit 214 (FIG. 5) is communicated to conduit 217 and thence to ball check valve 310 in brake and clutch link module 300 (FIG. 6). Fluid pressure at ball check valve 310 is further communicated via passage 339 and branch passage 340 to valve 321 for the purpose of inhibiting lateral movement of control lever 500 as described above. Fluid pressure in passage 339 is also communicated to passage 377 and thence to conduit 326 for activation of clutch 522 (FIG. 11) so that continued counterclockwise rotation of arm 519 in the upshift direction will now move shaft 410 leftwardly by means of lever 531. Such movement leftwardly of shaft 410 will properly stroke the hydrostatic units. Pressure in passage 377 is also communicated to passage 379 and annulus 380 of valve 352 in sensor pilot section 306 (FIG. 6). Pressure at annulus 380 will be communicated to annulus 381 when hydrostatic unit B 404 reaches a zero speed condition as shown at point 555 in FIG. 9. Such a zero speed condition in hydrostatic unit B 404 will result in the transmission of a signal from zero speed sense unit 79 via conduit 98 to valve 352 in FIG. 6. Fluid pressure at annulus 381 is transmitted via ball check valve 362 to upshift blocking brake 504 via conduit 312.

Upshifting From Second Gear Range to Third Gear Range

Again, as noted above, selector valve 113, (FIG. 4) is shifted rightwardly as control lever 500 passes through the approximate position 500-5 thereby establishing a condition favorable to a shift in range gear sets 32 from a second ratio to a third ratio. When control lever 500 reaches position 500-10 hydrostatic unit B 404 has reached a zero speed condition as indicated at point 555 in FIG. 9. Thus as described above, the inhibitor function of inhibitor pilot section 302 is relieved and control lever 500 may be shifted across gate 517 to position 500-11 thereby returning directional control valve 104 (FIG. 4) back to position A. Fluid is then communicated via annulus 155, chamber 119, passage 118, ball check valve 158, annulus 160 around selector valve 111. From annulus 160, fluid pressure is transmitted via passage 164 to annulus 183, passage 184 thence to annulus 185. Fluid pressure in annulus 185 is communicated to annulus 186 and thence to passage 187. Fluid pressure in passage 187 pressurizes conduit 124 at ball check valve 235 (FIG. 5) communicating fluid pressure to conduit 236 through ball check valve 237 to conduit 238 thereby retaining pressure in chamber 239 thus clutch 63 in range gear set 32 remains engaged to gear train 46. Pressure in conduit 124 further pressurizes conduit 202 which in turn pressurizes chamber 243 of third range actuator 245, forcing piston 246 leftwardly to engage clutch 69 of range gear set 32 (FIG. 3). Simultaneously, pressure in conduit 202 is communicated to conduit 204 and in turn to ball check valve 328 shown in FIG. 6. Further operation of the brake and clutch link module 300 follows that described above in the first gear and second gear range.

Operation of the fourth and fifth gear ranges is similar to that described above and will not be discussed in detail. However, it should be noted that in all five of the forward gear ranges, directional actuator 216 is pressurized thereby engaging clutch 64 with forward planet gear 65 of directional drive section 54 shown in FIG. 3. Furthermore, clutch 63 of range gear sets 32 is engaged in the second to fifth gear ranges as is indicated in the discussion of the second and third gear range above.

One example of downshift is necessary for a complete understanding of the downshift blocking brake 502 and the clockwise rotation of shaft 520. Assume the second gear range has been selected and the displacement of hydrostatic unit B 404 is decreased toward a zero condition. Concurrently, the speed of hydrostatic unit A 402 is approaching zero, position 550 FIG. 9. Upon reaching a zero condition a signal in conduit 96 opens annulus 390 to annulus 391 of valve 358 (FIG. 6), thereby pressurizing passage 392 and passage 393 by displacing ball check valve 360 upwardly. Pressure in passage 393 is transmitted via conduit 314 to downshift blocking brake 502 which stops further clockwise rotation of shaft 520 until first range is selected by movement of lever 500 from position 500-2 to 500-1 with a resulting shift in valve 104.

Movement of control lever 500 across gated plate 517 to the reverse ranges C and D (FIG. 10) shifts directional spool valve 104 inwardly to position C or D as shown in FIG. 4. In position C, fluid from passage 121 is communicated to speed selector valve 111 via passage 136 and ball check valve 158. Fluid is also communicated to ball check valve 138 thence passage 138 to conduit 150, fluid pressure in conduit 150 shifts piston 222 of reverse actuator 216 (FIG. 5) leftwardly, thus shifting clutch 64 and reversing the direction of the output of directional drive section 54. Similarly, when control lever 500 is moved further to the right across gated plate 517 to position 500-4 (FIG. 10) to select second range reverse, directional spool valve 104 is moved to the extreme right position D (FIG. 4). Fluid is then supplied to speed selector valve 112 from passage 156 via passage 153 and ball check valve 166. Simultaneously fluid in passage 153 moves ball check valve 138 leftwardly to provide pressure to conduit 150, thereby maintaining piston 222 in its leftward position. Operation of the first and second range clutches and the remainder of the transmission is as described in the discussion above of the forward ranges.

Figure 14:
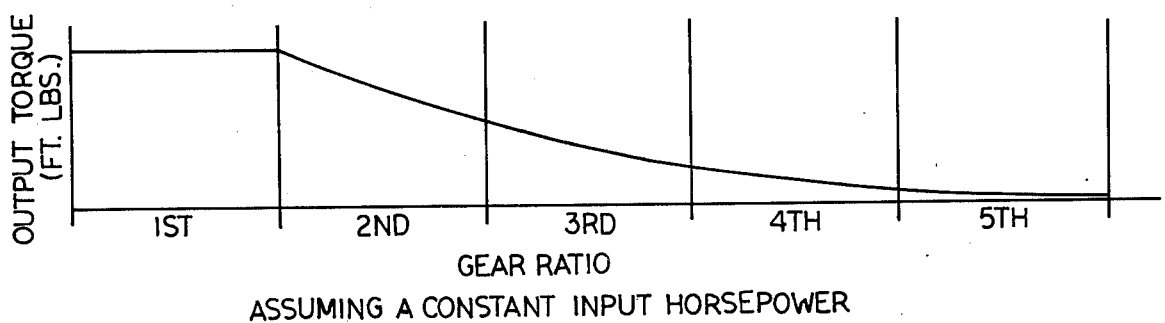
FIG. 14 shows a graph of output torque shown in relation to the selected gear ratio.

Torque is available at the output shaft 58 as illustrated in FIG. 14. Because of the direct coupling of hydrostatic drive unit B to the directional drive section, output torque in the first range is constant, varying from one hundred precent hydrostatic at the starting or zero shaft output speed to one hundred precent mechanical when the speed of hydrostatic unit A 402 reaches zero. In the upper ranges the drive varies from one hundred percent mechanical to approximately eightly percent mechanical and twenty percent hydrostatic, with the greatest portion of hydrostatic drive occurring midway between the shift points.

What is claimed is:

1. A split torque transmission comprising:
   an input shaft;
   an output shaft;
   a recycling planetary unit comprising a first planetary gear assembly, and a second planetary gear assembly, the first and second planetary gear assemblies having a common planet gear carrier;
   said first planetary gear assembly further comprising a first sun gear, a plurality of first planet gears carried by the common planet carrier, and a first ring gear, the first sun gear intermeshing with the first planet gears, and the first planet gears intermeshing with the first ring gear;
   said second planetary gear assembly further comprising a second sun gear, a plurality of second planet gears carried by the common planet carrier, and a second ring gear, the second sun gear intermeshing with the second planet gears, and the second planet gears intermeshing with the second ring gear, the first planet gears in intermeshing relation with the second planet gears;
   the input shaft drivingly connected to the common planet carrier;
   a hydrostatic drive means comprising first and second variable displacement hydrostatic devices hydraulically coupled together, each device able to act as a motor while the other device acts as a pump, the hydrostatic drive means further comprising a source of fluid under pressure, means for relieving excess pressure, and means for providing fluid under pressure to the first and second variable displacement hydrostatic devices;
   a directional drive gear train assembly;
   a first gear train assembly comprising a first gear train and a first sensing means, the first gear train drivingly connecting the first sun gear to the first variable displacement hydrostatic device and the first sensing means for signalling a zero speed condition in the first variable displacement hydrostatic device;
   a second gear train assembly comprising a second gear train and a second sensing means, the second gear train drivingly connecting the second sun gear to the second variable displacement hydrostatic device and the second sensing means for signalling a zero speed condition in the second variable displacement hydrostatic device;

a third gear train assembly drivingly connected with the first ring gear;

a fourth gear train assembly drivingly connected with the second ring gear;

first clutch means for allowing selective engagement and disengagement of the second gear train assembly with the directional drive gear train assembly;

second clutch means for allowing selective engagement and disengagement of the fourth gear train assembly with the directional drive gear train assembly;

third clutch means for allowing selective engagement and disengagement of the third gear train assembly with the output shaft;

fourth clutch means for allowing selective engagement and disengagement of the fourth gear train assembly with the output shaft;

the directional drive gear train assembly comprising;

a directional planetary gear assembly comprising a directional planet carrier, a plurality of forward planet gears carried by the directional planet carrier, a plurality of reverse planet gears carried by the same directional planet carrier adjacent to and independent of the forward planet gears, a plurality of intermediate planet gears carried by the same directional planet carrier in the same plane as the reverse planet gears and intermeshing therewith, a forward sun gear intermeshing with the forward planet gears, a reverse sun gear intermeshing with the intermediate planet gears, and a nonrotating ring gear movable in a first direction to a first position to engage the forward planet gears and movable in a second direction to a second position to engage the reverse planet gears;

drive shaft means driven at a first end by the second gear train while the first clutch means is engaged and driven at the same first end by the fourth gear train while the second clutch means is engaged, the drive shaft means further having drivingly mounted thereon at the second opposite end the forward sun gear of the directional planetary gear assembly and adjacent thereto the drive shaft means having drivingly mounted thereon the reverse sun gear of the directional planetary gear assembly; and directional drive engagement means comprising a directional clutch means for selectively engaging or disengaging the directional planet carrier with the output shaft.

2. The transmission set forth in claim 1, wherein the third clutch means comprises: a third range clutch allowing selective connection and disconnection of the third gear train assembly with the output shaft.

3. The transmission as set forth in claim 2 wherein the drive shaft means comprises a hollow shaft having mounted coaxially therein the output shaft.

4. The transmission as set forth in claim 3 wherein the third clutch means further comprises: an overdrive planetary gear assembly comprising an overdrive planet carrier, a plurality of overdrive planet gears carried by the overdrive planet carrier, an overdrive sun gear drivingly connected to the output shaft, and a nonrotating overdrive ring gear, the plurality of overdrive planet gears in intermeshing relationship with the overdrive sun gear and the nonrotating overdrive ring gear, and, a fifth range clutch allowing selective connection and disconnection of the third gear train assembly with the overdrive planet carrier.

5. A hydraulically controlled split torque transmission comprising:

an input shaft;

an output shaft;

torque splitting means for dividing torque supplied to the input shaft among a plurality of paths;

the torque splitting means comprising a planet carrier means, a first planetary gear assembly and a second planetary gear assembly, the first planetary gear assembly further comprising a first sun gear, a plurality of first planet gears carried by the planet carrier means, a first ring gear, the first sun gear intermeshing with the first planet gears, and the first planet gears intermeshing with the first ring gear, the second planetary gear assembly further comprising a second sun gear, a plurality of second planet gears carried by the planet carrier means, and a second ring gear, the second sun gear intermeshing with the second planet gears, and the second planet gears intermeshing with the second ring gear, the first planet gears in intermeshing relation with the second planet gears;

the input shaft drivingly connected to the planet carrier means;

a hydrostatic drive means comprising first and second variable displacement hydrostatic devices hydraulically coupled together, each device able to act as a motor while the other device acts as a pump, the hydrostatic drive means further comprising; a source of fluid under pressure, means for relieving excess pressure, and means for providing fluid under pressure to the first and second variable displacement hydrostatic devices;

a first gear train assembly drivingly connecting the first sun gear to the first variable displacement hydrostatic device, the first gear train assembly further comprising a first gear train, and a first sensing means for sigalling a zero speed condition in the first variable displacement hydrostatic device;

a second gear train assembly drivingly connecting the second sun gear to the second variable displacement hydrostatic device, the second gear train assembly further comprising a second gear train and a second sensing means for signalling a zero speed condition in the second variable displacement hydrostatic device;

a third gear train assembly drivingly connected with the first ring gear;

a fourth gear train assembly drivingly connected with the second ring gear;

a directional drive gear train assembly;

first clutch means for allowing selective engagement and disengagement of the second gear train assembly with the directional drive gear train assembly;

second clutch means for allowing selective engagement and disengagement of the fourth gear train assembly with the directional drive gear train assembly;

third clutch means for allowing selective engagement and disengagement of the third gear train assembly with the output shaft;

fourth clutch means or allowing selective engagement and disengagement of the fourth gear train assembly with the output shaft;

drive engagement means for selectively engaging and disengaging the directional drive gear train means with the output shaft; and hydraulic control means for varying the displacement of the first and second variable displacement hydrostatic devices while inhibiting disengagement of the output shaft from the torque splitting means, the hydraulic control means further comprising blocking means for preventing a change in the displacement in the first and second hydrostatic devices while one of the several gear train assemblies is being selectively engaged with the output shaft;

the first sensing means further comprising means for allowing rotation of the first variable displacement hydrostatic device in one direction while preventing rotation of the first variable displacement hydrostatic device in the other opposite direction; and the second sensing means comprising means for allowing the second variable displacement hydrostatic device to rotate in one direction while preventing rotation in the second opposite direction.

6. The transmission as described in claim 5, wherein the hydraulic control means for varying the displacement of first and second variable displacement hydrostatic devices while inhibiting disengagement of the output shaft from the torque splitting means further comprises:

a control shaft axially rotatable in a first direction and axially rotatable in a second opposite direction;

a first lever arm engagement device;

a second lever arm engagement device;

a first lever arm rotatably mounted on said shaft wherein engagement of the first lever arm engagement device allows the first lever arm to rotate in said first direction in cooperation with said shaft; and a second lever arm rotatably mounted on said shaft wherein engagement of the second lever arm engaging device allows rotation of the second lever arm in said second direction in cooperation with said shaft; the first and second lever arms extending outwardly from said shaft in generally opposite directions;

link means for operatively connecting the first and second lever arms to the first and second variable displacement hydrostatic devices allowing the displacement of the first variable displacement hydrostatic devices to be varied from zero displacement toward maximum displacement while the displacement of the second variable displacement hydrostatic device is varied from maximum displacement to zero displacement with the first lever arm engagement means engaged with the first lever arm and allowing the displacement of the first variable displacement hydrostatic device to be varied from maximum displacement toward zero displacement while displacement of the second variable displacement hydrostatic device is varied from zero displacement to maximum displacement with the second lever arm engagement device engaged with the second lever arm; and lever means operatively connected to said control shaft for rotating said shaft.

7. The transmission as set forth in claim 6, wherein the blocking means comprises: a first brake; and a second brake; said first brake preventing rotation of the control shaft in said first direction while one of the several gear train assemblies is being selectively engaged with the output shaft and said second brake preventing rotation of the control shaft in said second opposite direction while one of the several gear train assemblies is being selectively engaged with the output shaft.

8. The transmission as set forth in claim 7 further comprising hydraulic means for engaging at least one of the clutch means allowing selective engagement of at least one of the several gear train assemblies.

9. The transmission as set forth in claim 8 further comprising valve means for allowing communication of hydraulic fluid between the source of fluid under pressure and the hydraulic means for controlling engagement of at least one of the clutch means, and further allowing communication of fluid pressure from the same source of fluid pressure to the means for replenishing fluid to the hydrostatic drive means while in the first position; and for blocking communication of fluid pressure from the source of fluid pressure to the hydraulic means for controlling engagement on one of the several clutch means and blocking communication of fluid pressure from the same source of fluid pressure to the means for replenishing the hydrostatic drive means when in a second position.

10. The transmission as set forth in claim 9 wherein the directional drive gear train assembly comprises a directional planet carrier, a plurality of forward planet gears carried by the directional planet carrier, a plurality of reverse planet gears carried by the same directional planet carrier adjacent to and independent of the forward planet gears, a plurality of intermediate planet gears carried by the same directional planet carrier in the same plane as the reverse planet gears and intermeshing therewith, a forward sun gear intermeshing with the forward planet gears, a reverse sun gear intermeshing with the intermediate planet gears, and a nonrotating ring gear movable in a first direction to a first position to engage the forward planet gears and movable in a second direction to a second position to engage the reverse planet gears;

drive shaft means driven at a first end by the second gear train while the first clutch means is engaged and driven at the same first end by the fourth gear train while the second clutch means is engaged, the drive shaft means further having drivingly mounted thereon at the second opposite end the forward sun gear of the directional planetary gear assembly and adjacent thereto the drive shaft means having drivingly mounted thereon the reverse sun gear of the directional planetary gear assembly; and wherein the drive engagement means for selectively engaging and disengaging the directional drive gear train means with the output shaft further comprises a directional clutch means for selectively engaging or disengaging the directional planet carrier with the output shaft.

11. The transmission as set forth in claim 10 wherein the third clutch means comprises:

a third range clutch allowing selective connection and disconnection of the third gear train assembly with the output shaft; and an overdrive planetary gear assembly comprising in overdrive planet carrier, a plurality of overdrive planet gears carried by the overdrive planet carrier, an overdrive sun gear drivingly connected with the output shaft, and a nonrotating overdrive ring gear, the plurality of overdrive planet gears in intermeshing relationship with the overdrive sun gear and the nonrotating overdrive ring gear, and a fifth range clutch allowing selective connection and disconnection of the third gear train assembly with the overdrive planet carrier.

* * * * *